(12) United States Patent
Abdul Jabbar et al.

(10) Patent No.: US 11,701,826 B2
(45) Date of Patent: Jul. 18, 2023

(54) 3-D PRINTER APPARATUS

(71) Applicant: Nissan North America, Inc., Franklin, TN (US)

(72) Inventors: Mohammed Hussain Abdul Jabbar, Farmington Hills, MI (US); Sandeep Patil, Farmington Hills, MI (US); Nanzhu Zhao, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 35 days.

(21) Appl. No.: 17/008,379

(22) Filed: Aug. 31, 2020

(65) Prior Publication Data

US 2022/0063194 A1 Mar. 3, 2022

(51) Int. Cl.
| | |
|---|---|
| *B29C 64/255* | (2017.01) |
| *B29C 64/393* | (2017.01) |
| *B33Y 50/02* | (2015.01) |
| *B29C 64/124* | (2017.01) |
| *B33Y 30/00* | (2015.01) |
| *B33Y 10/00* | (2015.01) |

(52) U.S. Cl.
CPC .......... *B29C 64/255* (2017.08); *B29C 64/124* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/255; B29C 64/124; B29C 64/393; B33Y 10/00; B33Y 30/00; B33Y 50/02
See application file for complete search history.

(56) References Cited

U.S. PATENT DOCUMENTS

| | | |
|---|---|---|
| 9,782,934 B2 | 10/2017 | Willis et al. |
| 10,016,938 B2 | 7/2018 | DeSimone et al. |
| (Continued) | | |

FOREIGN PATENT DOCUMENTS

| | | | | |
|---|---|---|---|---|
| WO | 2019059669 A1 | 3/2019 | | |
| WO | WO-2020185692 A2 | * | 9/2020 | ........... B29C 64/129 |

OTHER PUBLICATIONS

Chengxiang Xiang, Kimberly M. Papadantonakis, Nathan S. Lewis, Principles and Implementations of Electrolysis Systems for Water Splitting, Feb. 12, 2016, Materials Horizons, vol. 3, pp. 169-173 (Year: 2016).*

(Continued)

*Primary Examiner* — Leith S Shafi
*Assistant Examiner* — Xinwen Ye
(74) *Attorney, Agent, or Firm* — Global IP Counselors, LLP

(57) ABSTRACT

A 3-D printer apparatus (three-dimensional printer apparatus) includes a bottom structure of a tank. The tank defines a printing area located above and spaced apart from the bottom structure. The bottom structure includes oxygen releasing electrodes. A resin curing device is configured to selectively provide light to the printing area. The electronic controller controls operation of the resin curing device and the oxygen releasing electrodes. The electronic controller selectively operates areas of the oxygen releasing electrodes thereby releasing oxygen to predetermined locations below the printing area in order to temporarily prevent the polymerization of a polymerizable resin within predetermined locations of the printing area during the printing process.

18 Claims, 8 Drawing Sheets

(56) References Cited

U.S. PATENT DOCUMENTS

| | | | | |
|---|---|---|---|---|
| 2014/0308591 A1* | 10/2014 | Alkemade | ............ | H01M 12/08 |
| | | | | 429/405 |
| 2016/0059486 A1* | 3/2016 | DeSimone | ............ | B29C 64/124 |
| | | | | 425/162 |
| 2017/0047594 A1* | 2/2017 | Hanafusa | ............ | B29C 45/0053 |
| 2018/0009163 A1* | 1/2018 | Craven | ................ | B29C 64/129 |
| 2021/0094231 A1* | 4/2021 | Feller | ..................... | B33Y 10/00 |

OTHER PUBLICATIONS

Sungyoung Choi and Je-Kyun Park, Microfluidic System for Dielectrophoretic Separation based on Trapezoidal Electrode Array, Aug. 2, 2005, Advance Article (Year: 2005).*

M.R.Ahmad, M.H. Md Khir, J. Dennis, Design and Modeling of the Trapezoidal Electrodes Array for Electrets Energy Harvester, May 28, 2013, Processdings of SPIE (Year: 2013).*

Walker et al., Rapid, large-volume, thermally controlled 3D printing using a mobile liquid interface, Science, Oct. 18, 2019, pp. 360-364, the American Association for the Advancement of Science, Washington, DC, USA.

* cited by examiner

3-D PRINTER APPARATUS

BACKGROUND

Field of the Invention

The present invention generally relates to three-dimensional printers (3-D printers). More specifically, the present invention relates to 3-D printer that includes an oxygen providing device that selectively produces oxygen to predetermined sections of a printing area thereby temporarily preventing printing in the predetermined sections of the printing area.

Background Information

Three-dimensional printers (3-D printers) have been used to print a wide variety of three-dimensional products. Objects are printed layer by layer by the 3-D printer by curing portions of a light curable photopolymer layer by layer, one layer at a time, within a printing area of a tank filled with the photopolymer. A curing device, such as an ultraviolet light source, is projected through a transparent substrate or bottom wall of the tank curing each layer of the object on a carrier surface that is at least partially submerged within the photopolymer. The carrier surface is incrementally raised upward as each layer is cured thereon. One problem with 3-D printing, is that the printing process is time consuming.

SUMMARY

It has been discovered that by introducing small amounts of oxygen into predetermined sections of a printing area of a 3-D printer tank during the printing process prevents curing of a polymerizable polymers located within the predetermined sections of the printing area, enabling the use of more intense concentrations of resin curing light to cure remaining sections of the printing area, thereby speeding up the printing process.

One object of the present disclosure is to shorten the curing time of a polymerizable polymer during a printing process in a 3-D printing apparatus.

Another object of the present disclosure is to provide the tank of a 3-D printer with an array of electrodes that can be selectively operated to produce oxygen from water in predetermined sections of the printing area of the 3-D printer.

In view of the state of the known technology, one aspect of the present disclosure is to provide a 3-D printer apparatus (three-dimensional printer apparatus) with a tank, an oxygen source, a gas-permeable liquid, a polymerizable resin, an object carrier, a carrier movement device, a resin curing device and an electronic controller. The tank has bottom structure and defines a printing area located above and spaced apart from the bottom structure. The bottom structure is transparent and includes oxygen releasing electrodes. The oxygen source located below the bottom structure and the oxygen releasing electrodes. The gas-permeable liquid is within the tank above and along the bottom structure of the tank defining a dead zone below the printing area above the oxygen releasing electrodes. The polymerizable resin is within the tank and is located above the gas-permeable liquid above and within the printing area. The object carrier initially located within the tank during a printing process. The carrier movement device attached to the object carrier. The resin curing device is configured to selectively provide light to the printing area. The electronic controller controls operation of the resin curing device, the carrier movement device and the oxygen releasing electrodes. The electronic controller selectively operates areas of the oxygen releasing electrodes thereby releasing oxygen to predetermined locations below the printing area in order to control curing of the polymerizable resin during the printing process.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
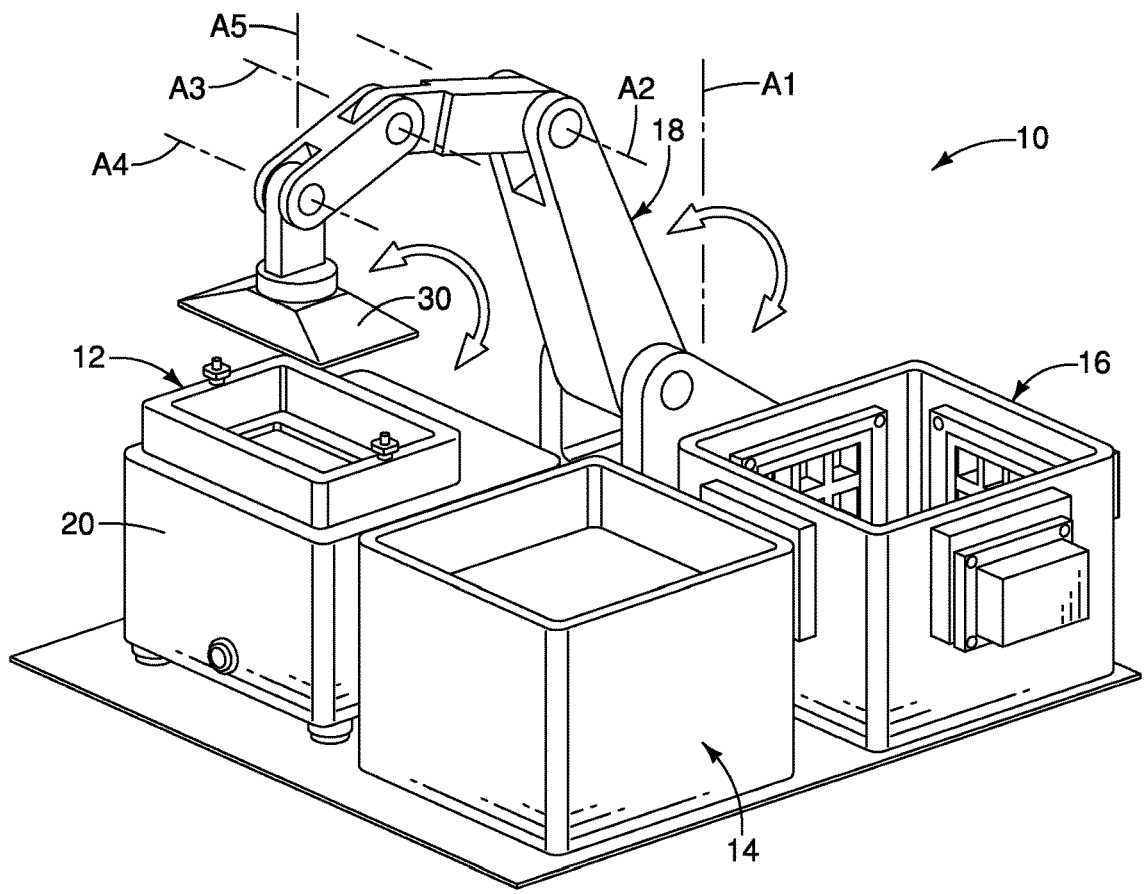
FIG. 1 is a perspective view of a 3-D printer apparatus that includes a printer assembly, a rinse station, a final curing station and a robotic arm in accordance with a first embodiment.

Referring initially to FIG. 1, a three-dimensional printer apparatus 10 (hereinafter the 3-D printer apparatus 10) is illustrated in accordance with a first embodiment. The 3-D printer apparatus 10 includes a printer assembly 12, a rinse station 14, a final curing station 16 and a robotic arm 18.

As shown in FIG. 1, the 3-D printer apparatus 10 is shown with the printer assembly 12, the rinse station 14, the final curing station 16 and the robotic arm 18 are shown as an assembled group of devices. Alternatively, the 3-D printer apparatus 10 can be separate stations that are individual units where the robotic arm 18, or a series of robotic arms are operated together in order to access and utilize the features of each of separated versions of the printer assembly 12, the rinse station 14 and the final curing station 16.

Alternatively, the 3-D printer apparatus 10 can consist of only the printer assembly 12 and the robotic arm 18.

Figure 2:
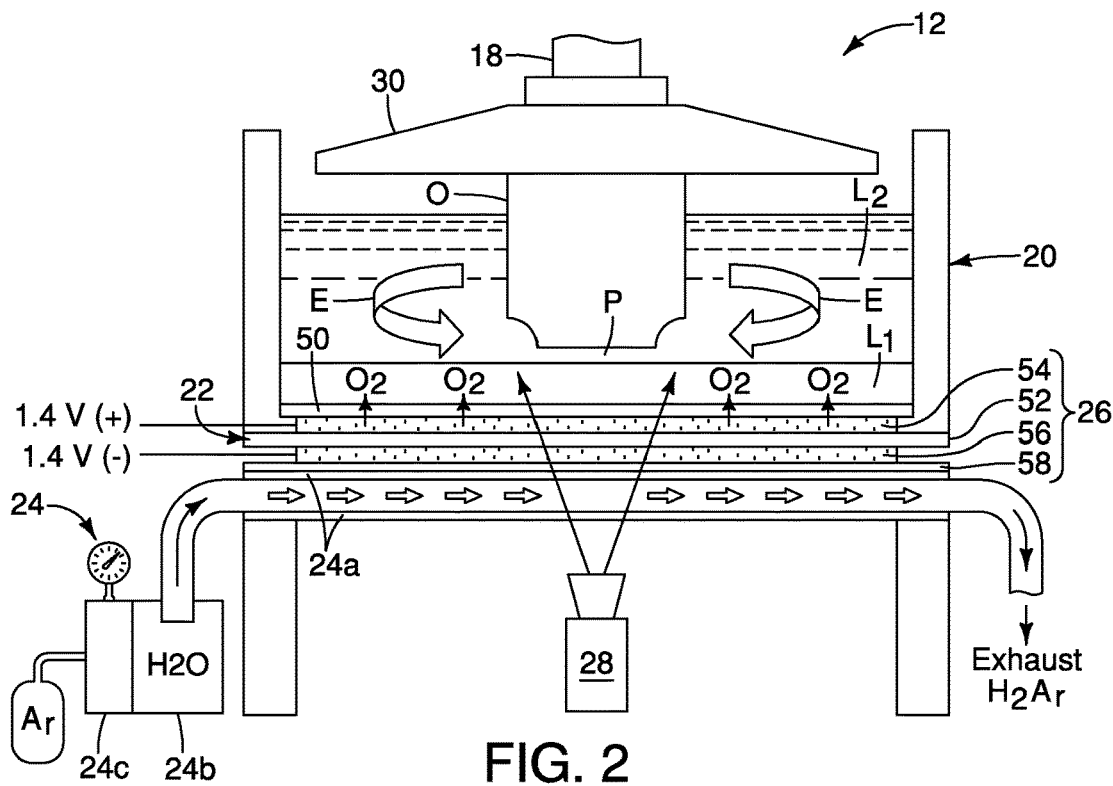
FIG. 2 is a side view of the printer assembly showing a tank, a first layer of liquid and a second later of liquid within the tank, a printer area, a bottom structure of the tank including an oxygen providing device and an oxygen source, and a resin curing device in accordance with the first embodiment.

As shown schematically in FIG. 2, the printer assembly 12 includes a tank 20 that has a bottom structure 22 with an oxygen source 24 and an oxygen providing device 26, a resin curing device 28, an object carrier 30 connected to the robotic arm 18 and an electronic controller 32. A more detailed description of each of these portions of the printer assembly 12 is provided after a brief overview of the basic functions of these features.

As is also shown in FIG. 2, during operation of the printer assembly 12, the tank 20 is at least partially filled with two differing liquid layers. First, there is a bottom layer $L_1$ that is a gas permeable liquid within the tank 20 that is located along and covers an upper surface of the bottom structure 22 of the tank 20. The bottom layer $L_1$ is also referred to herein below as the gas permeable liquid $L_1$. During the printing operations of the printer assembly 12, the gas permeable liquid $L_1$ defines what is referred to hereinafter as a mobile layer (sometimes referred to as a dead zone) below a printing area P within the tank 20, as is described in greater detail below.

A top layer $L_2$ is a polymerizable resin above and covering the gas permeable liquid $L_1$. The top layer $L_2$ is also referred to herein below as the polymerizable resin $L_2$. The polymerizable resin $L_2$ is located within the tank 20 such that a portion of the polymerizable resin $L_2$ flows freely into the printing area P during the operation of the printing assembly 12, as is described in greater detail below. The polymerizable resin $L_2$ can be supplied to the tank 20 such that the polymerizable resin $L_2$ fills most or all of the interior volume of the tank 20, depending upon the object being printed and the anticipated volume of use of polymerizable resin $L_2$ needed to print the object being printed by the printer assembly 12.

One of the purposes of the gas permeable liquid $L_1$ (the mobile layer) is to separate and space apart the polymerizable resin $L_2$ from the bottom structure 22 of the tank 20 for reasons that are described in greater detail below.

The printing area P is defined as being the space below the object carrier 30 (at and/or below a lower surface of the object O being printed) and the upper surface of the gas-permeable liquid $L_1$. Further, the printing area P is located above and spaced apart from the bottom structure 22 of the tank 20.

Figure 3:
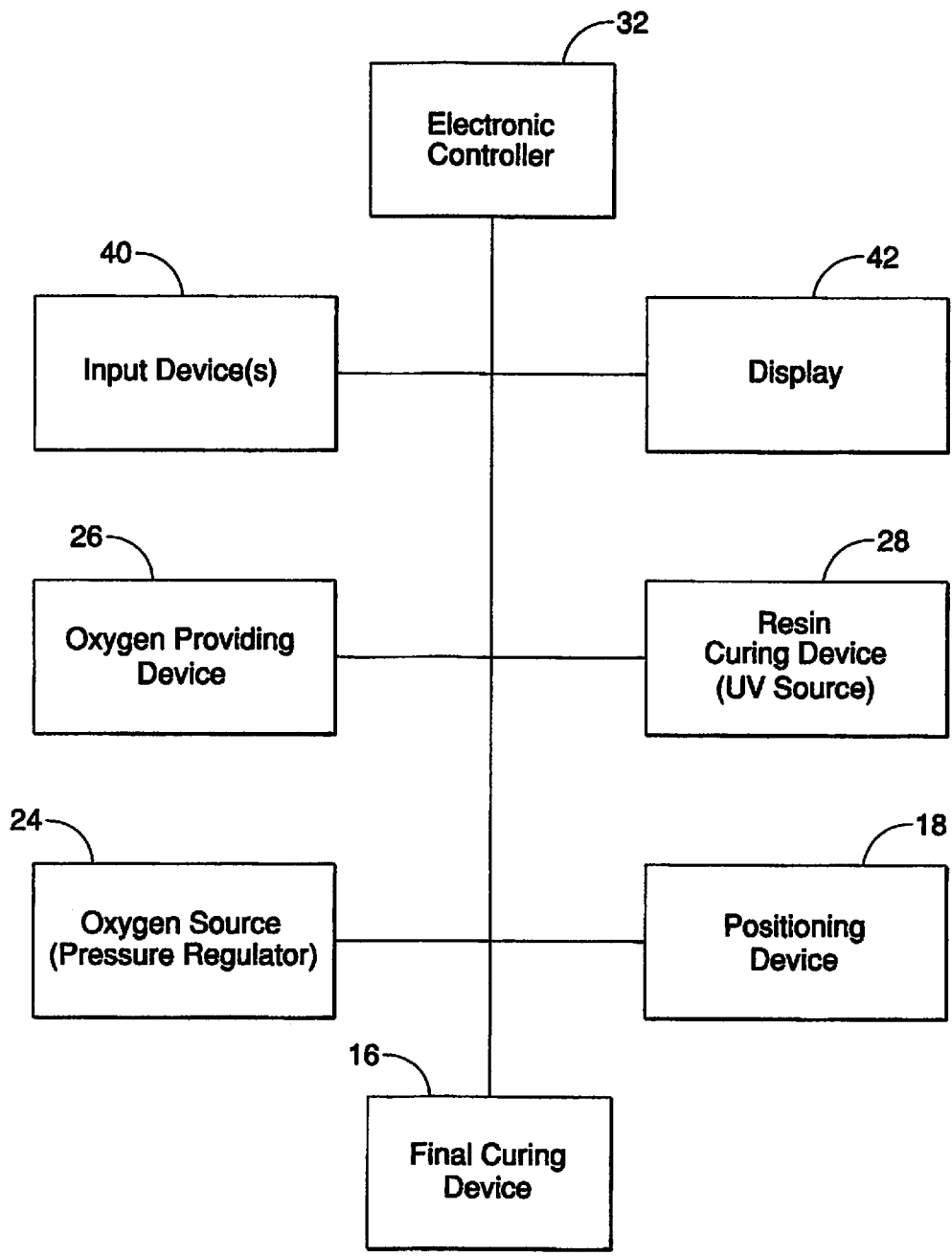
FIG. 3 is a block diagram showing an electronic controller that is in electronic communication with and controls operation of the robotic arm, the resin curing device and the oxygen providing device in accordance with the first embodiment.

As shown in FIG. 3, the 3-D printer apparatus 10 further includes the electronic controller 32, an input device 40 and a display 42. As is shown in FIG. 3, the electronic controller is electronically connected to, or, alternatively can be in wireless electronic communication with the input device 40, the display 42, the oxygen providing device 26, the oxygen source 24, the resin curing device 28, the final curing station 16 and the robotic arm 18 (the positioning device 18) which includes the object carrier 30.

The input device 40 can be any combination of, or all of: a mouse, keyboard, USB port, wireless communication device (i.e., WiFi), Ethernet connection, etc. Further, the display 42 can be a touch screen display or non-touch screen display. The oxygen source 24 is a water ($H_2O$) source with pump and/or flow regulator system that is connected to a feed line or pipe 24a (a conduit) that provides water to the oxygen providing device 26. The oxygen source 24 is referred to as an oxygen source because it supplies the material needed in order for the oxygen providing device 26 to selectively produce oxygen. Water, consisting of oxygen and hydrogen $H_2O$, is an excellent source of material for producing oxygen where the production of oxygen is precisely controlled and directed to very specific predetermined sections of the printing area P, as is described further below. The water within the oxygen source 24 is also mixed with Argon (Ar) gas that assists in directing hydrogen out of and away from the oxygen providing device 26.

It should be understood from the drawings and the description herein that other sources of oxygen can be substituted for the water supplied by the oxygen source 24, such as, for example, tanks of pressurized oxygen.

The oxygen providing device 26 is an array of electrodes that extract oxygen from the water supplied by the oxygen source 24 via electrolysis, as described in greater detail below. The resin curing device 28 is installed or located below the tank 20 and is positioned to selectively project light upward through the transparent bottom structure 22 of the tank structure 20. The electronic controller 32 controls operation of the resin curing device 28 to cure and harden the polymerizable resin $L_2$ (layer $L_2$) located within the printing area P in order to form the object O. The resin curing device 28 can be any of a variety of resin curing light sources such as an ultra-violet projector, laser (stereolithography) digital light projector, liquid crystal display, projector or other light emitting device capable of electronic focusing and imaging focused light in order to selectively cure polymerizable resin to form the object O.

The electronic controller 32 preferably includes a microcomputer with printer and robotic arm control programs that control the 3-D printer apparatus 10, and mores specifically, the printer assembly 12 and the robotic arm 18, as discussed below. The electronic controller 32 can also include other conventional components such as an input interface circuit, an output interface circuit, and storage devices such as a ROM (Read Only Memory) device and a RAM (Random Access Memory) device. The microcomputer of the electronic controller 32 is programmed to control the printer assembly 12 and the robotic arm 18. The memory circuit stores processing results and control programs such as ones for printer and robotic arm operation that are run by the processor circuit. The electronic controller 32 is operatively and/or electronically coupled to the input device(s) 40, the display 42, the oxygen source 24, the oxygen providing device 26, the resin curing device 28, the final curing device 16 and the robotic arm 18 (and hence the object carrier 30) in a conventional manner. The internal RAM of the electronic controller 32 stores statuses of operational flags and various control data. The internal ROM of the electronic controller 32 stores the codes and instructions for various operations. It will be apparent to those skilled in the art from this disclosure that the precise structure and algorithms for the electronic controller 32 can be any combination of hardware and software that will carry out the functions of the present invention.

Referring again to FIG. 1, the object carrier 30 is attached to a distal end of the robotic arm 18 such that when the electronic controller 32 operates the robotic arm 18 to precisely position the object carrier 30. More specifically, the robotic arm 18 is configured to move the object carrier 30 vertically up and down within the tank 20 in small increments, such as a thousandth or several thousandths of an inch in one increment of movement. The robotic arm 18 is further configured to move the object carrier 30 and the object O printed thereon from the tank 20 of the printer assembly 12 to the rinse station 14 and further to the final curing station 16 (if necessary).

The robotic arm 18 is configured for movement about a vertical axis $A_1$, horizontal axes $A_2$, $A_3$ and $A_4$, as well as vertical axis $A_5$. Consequently, the object carrier 30 can be positioned by movement of the robotic arm 18 about five differing axes. It should be understood from the drawings and the description herein that the robotic arm 18 is configured for multiple degrees of freedom of movement for precise movement and positioning of the object carrier 30 and the object O produced by the 3-D printer apparatus 10. Since robotic arms are conventional electro-mechanical devices, further description is omitted for the sake of brevity.

A description of one embodiment of the tank 20 is now provided with specific reference to FIGS. 2 and 4-8. The tank 20 includes a four side walls and the bottom structure 22 that are attached to one another such that the tank 20 retains the liquids placed therein, including the gas-permeable liquid $L_1$ (bottom layer $L_1$) and the polymerizable resin $L_2$ (top layer $L_2$). The bottom structure 22 is made of transparent materials such that focused beams of light from the resin curing device 28 passes therethrough and at predetermined areas or portions of the polymerizable resin $L_2$ located within the printing area P.

Figure 4:
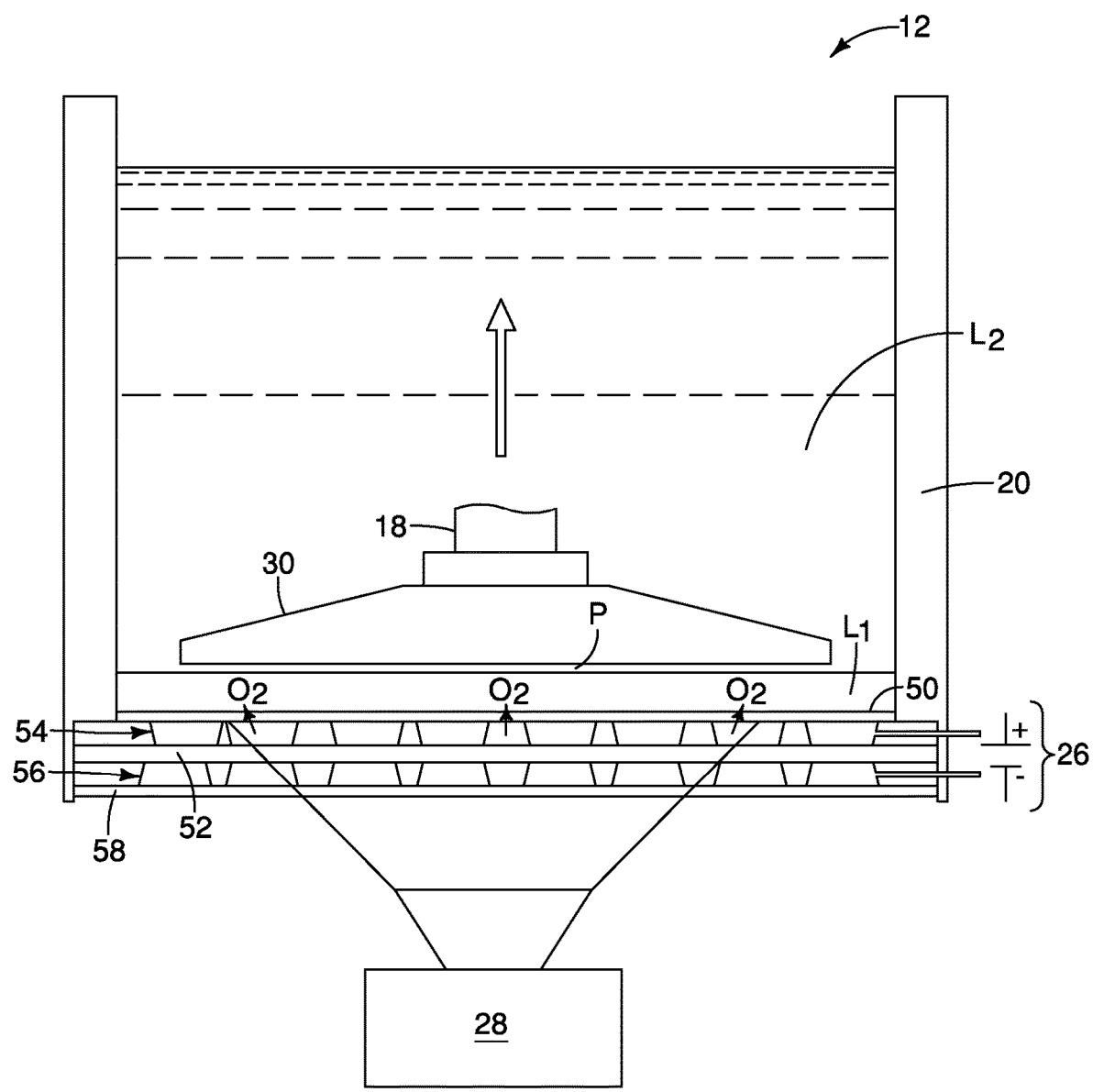
FIG. 4 is another side view of the printer assembly showing the tank, a first layer of liquid and a second later of liquid within the tank, the printer area within the tank, the bottom structure of the tank showing details of the oxygen providing device including a positive electrode array and a negative electrode array, with the oxygen source removed for clarity, and the resin curing device in accordance with the first embodiment.

As shown in FIGS. 2 and 4, the bottom structure 22 includes the oxygen source 24 and the oxygen providing device 26. The oxygen source 24 basically includes a water source 24b, a pressure regulation device 24c and the feed line or pipe 24a. The water source 24b can be filtered water but is preferably distilled water that is pumped or otherwise fed into and through the pipe 24a (conduit) and pressure regulated by the pressure regulation device 24c. As shown in FIG. 2, the pressure regulation device 24c is preferably supplied with argon (Ar) gas that mixes with the water flowing into and through the pipe 24a, as is described in further detail below. The pipe 24a is preferably a flat rectangular structure that covers the entire underside of the tank 20 and includes an upper surface that includes micro-perforations that allow the water flowing through the pipe 24a to seep upward to and through a glass substrate 58 and into the negative electrode array 56 in a manner similar to capillary movement of liquid through a small tube. The pressure regulating device 24c maintains both water pressure and argon gas pressure within the pipe 24a at an optimal pressure for seepage of water through the micro-perforations in the pipe 24a and into and through the glass substrate 58.

The pipe 24a can be the single structure described above, or, can alternatively be a plurality of parallel tubes with micro-perforations along upper surfaces thereof. In other words, the pipe 24a is not limited to a rectangular duct-like or tube-like structure but can be any of a variety of structural configurations that provide water to the underside of the oxygen providing device 26.

The glass substrate 58 is between 5 and 10 microns thick and is water permeable such that water seeping through the upper surface of the pipe 24a further seeps or is drawn through a glass substrate 58 to a positive electrode array 54 and a negative electrode array 56 (described further below). More specifically, at the positive electrode array 54 and the negative electrode array 56 the water pressure is low and is basically a capillary tube-like movement of water from the pipe 24a to the positive electrode array 54 and the negative electrode array 56 via the micro-perforations (not shown) in the upper surface of the pipe 24a.

The bottom structure 22 can further include an optional perforated insulating transparent sheet 50 (hereinafter referred to as the perforated sheet 50), a dense membrane 52, the positive electrode array 54, the negative electrode array 56 and the glass substrate 58.

The optional perforated insulating transparent sheet 50 (hereinafter referred to as the perforated sheet 50) located above the oxygen releasing electrodes (the glass substrate 58) and below the printing area P. The perforated insulating transparent sheet 50 of the bottom structure 22 is made from one or more of an oxygen permeable polymer, polytetrafluoroethylene and/or a suitable oxygen permeable material. The perforated insulating transparent sheet 50 is an optional feature and might not be required in all applications of the printer assembly 12.

The dense membrane 52 includes at least one of the following: a modified polytetrafluoroethylene layer, an oxide conducting glass, ceramics such as doped cerium oxide and/or an OER catalyst (oxygen evolution reaction catalyst such as cobalt or platinum, Co Pr, Ag, doped ceria) and/or a water splitting catalyst such as Pd, Pt or Ni.

The oxygen providing device 26 is basically defined by the dense membrane 52, the positive electrode array 54 and the negative electrode array 56.

The positive electrode array 54 is attached to an upper side (upper surface) of the glass substrate 58 and the negative electrode array 56 is attached to an underside (lower surface) of the glass substrate 58.

Figure 6:
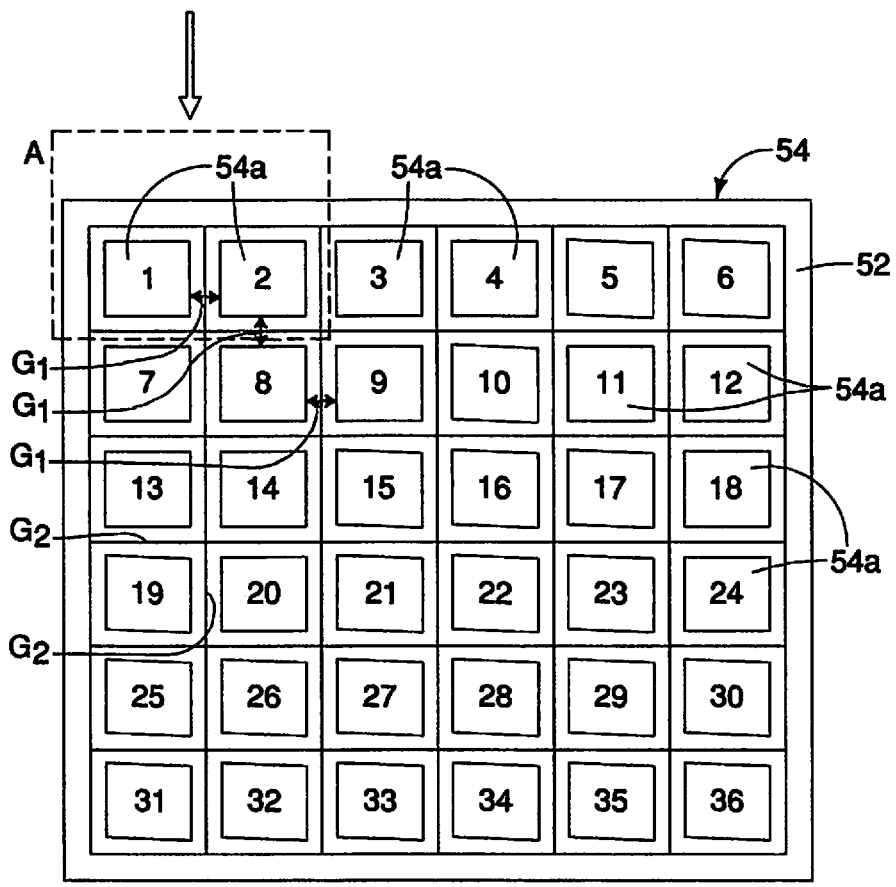
FIG. 6 is a bottom schematic view of a portion of the positive electrode array installed to an upper surface of the membrane showing lower surfaces an array of individual oxygen producing electrodes that define a pixilated array of electrodes of the positive electrode array, in accordance with the first embodiment.
Figure 7:
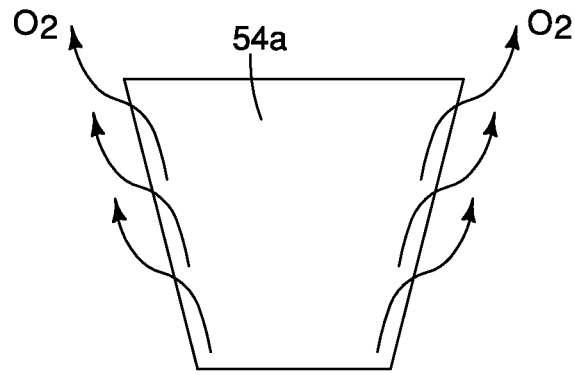
FIG. 7 is a side view of one of the oxygen producing electrodes shown removed from the positive electrode array, the oxygen producing electrode being provided with a positive charge in the presence of water causing the water to undergo electrolysis and form oxygen molecules in accordance with the first embodiment.

The positive electrode array 54 includes an array of electrodes 54a. Each electrode 54a includes a material or materials that, when provided with a positive electrical potential in the presence of water, causes the electrolysis of the water, releasing oxygen molecules ($O_2$). For example, each electrode 54a can include a predetermined content of, or, be coated with platinum. Each of the oxygen releasing electrodes 54 is arranged in a pixelated array (the positive electrode array 54) that varies in size and number depending upon the size of the printer assembly 12 and/or the size and desired tolerances of the object O being produced. For example, the array of oxygen releasing electrodes 54a can be 1000 by 1000 electrodes, 2000 by 2000 electrodes, any value in between or value greater than 2000 by 2000. FIG. 6 shows a simplified 6×6 array of the electrodes 54a for exemplary purposes only.

Figure 5:
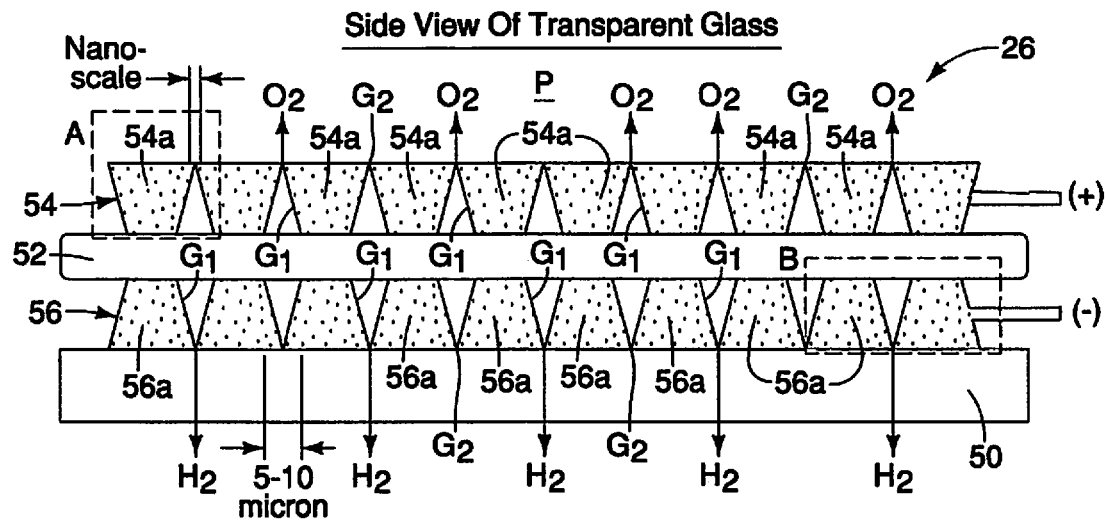
FIG. 5 is a side view of the oxygen providing device showing details of the positive electrode array, the negative electrode array with a membrane therebetween and a glass substrate in accordance with the first embodiment.

Each electrode is manufactured with nanometer precision such that each electrode 54a is no more than 5-20 microns in width. In the depicted embodiment, the electrodes 54a are between 10 and 20 microns. As shown in FIG. 5, each electrode 54a is larger at an upper end than at a lower end thereof. In the side view of FIG. 5, each electrode 54a has an overall isosceles trapezoidal shape. A space or gap $G_1$ is defined between lower ends of adjacent electrodes 54a. As shown in FIG. 5, the gaps $G_1$ are between 5 and 10 microns (proportional to the overall dimensions of the lower ends of the electrodes 54a). Between upper ends of adjacent electrodes 54a gaps $G_2$ are defined. Each gap $G_2$ between adjacent electrodes 54a is smaller than the gaps $G_1$. In the depicted embodiment each gap $G_2$ is less than 1 micron in width. The gaps $G_2$ are preferably between 10-100 nanometer, as shown in FIGS. 5 and 6.

One additional feature of the oxygen releasing electrodes 54a and the positive electrode array 54 is that when operating, the positive electrode array 54 generates electro-osmotic flow of the polymerizable resin $L_2$ (top layer $L_2$) within the tank 20. More specifically, the electro-osmotic flow of the polymerizable resin $L_2$ is produced by the positive electrode array 54 which causes the polymerizable resin $L_2$ to move into the printing area P after a layer of the resin has been cured forming another layer of the object O, as is described in greater detail below.

The negative electrode array 56 includes an array of electrodes 56a. Each electrode 56a includes a material or materials that, when provided with a negative electrical potential in the presence of water, causes the electrolysis of the water, releasing hydrogen molecules ($H_2$). For example, each electrode 56a can include a predetermined content of, or, be coated with palladium. Each of the hydrogen releasing electrodes 56 is arranged in a pixelated array (the negative electrode array 56) that varies in size and number depending upon the size of the printer assembly 12 and/or the size and desired tolerances of the object O being produced. For example, the array of oxygen releasing electrodes 54a can be 1000 by 1000 electrodes, 2000 by 2000 electrodes, any value in between or value greater than 2000 by 2000. Preferably, the size, number and array arrangement of the electrodes 56a of the negative electrode array 56 is the same as the positive electrode array 54.

Figure 8:
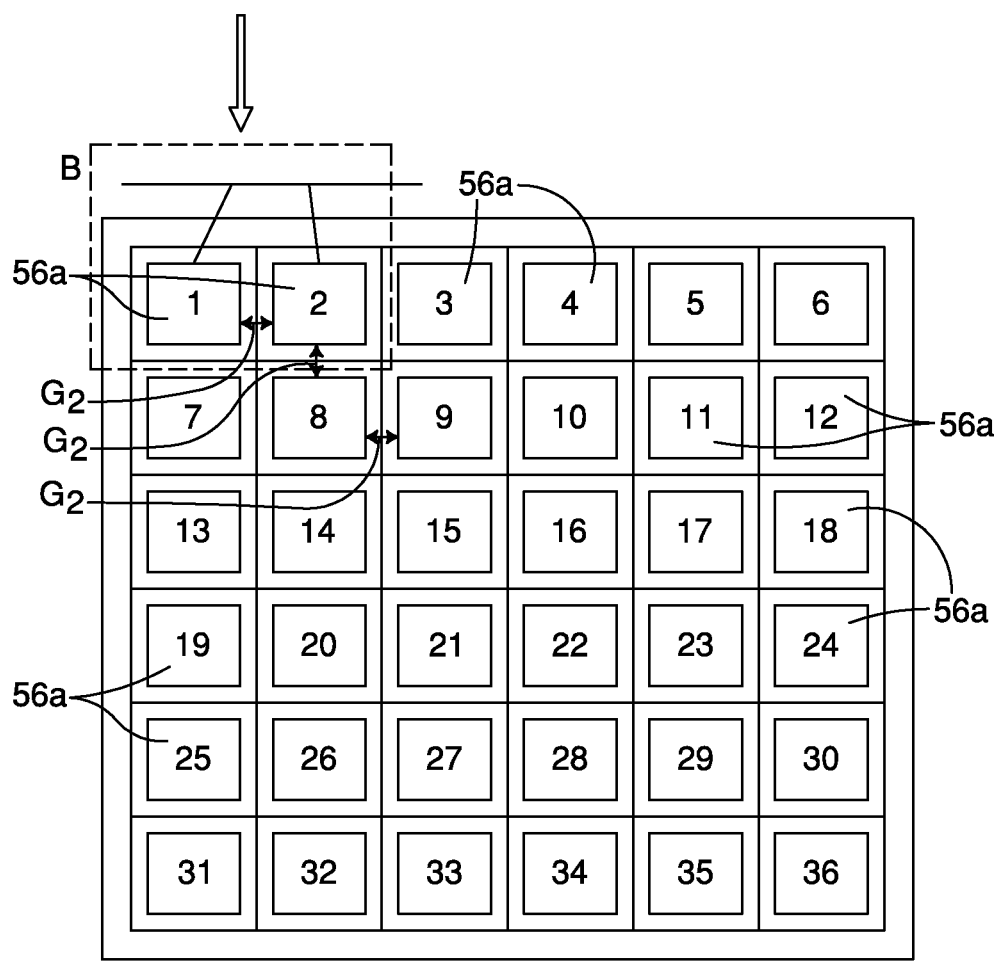
FIG. 8 is a bottom schematic view of a portion of the negative electrode array installed to a bottom surface of the membrane showing an array of individual oxygen producing electrodes that define a pixilated array of electrodes that define the positive electrode array in accordance with the first embodiment.

Each electrode 56a is manufactured with nanometer precision such that each electrode 56a is no more than 5-20 microns in width, and gaps between adjacent electrodes 56a are less than 1 micron in width, and, are further preferably between 1-100 nanometers, as shown in FIGS. 5 and 8.

The lower array of the hydrogen releasing electrodes 56a below the membrane 52 and the upper array of the oxygen releasing electrodes 54a are arranged such that during operation of the oxygen releasing electrodes 54a, the electronic controller 32 selectively applies a positive electric potential to predetermined ones of the oxygen releasing electrodes 54a and selectively supplies a negative electric potential to predetermined ones the hydrogen releasing electrodes 56a (the lower array of electrodes 56a). More specifically, in order to prevent curing of portions polymerizable resin $L_2$, electric potential is provided to those electrodes 54a and 56a below predetermined locations or section within the printing area P where a void is necessary in the object O. In other words, the predetermined locations and/or sections of the printing area P are not to be provided with cured resin. Since the presence of oxygen prevents curing of the polymerizable resin $L_2$, areas in the printing area P where the object O will have cured material is not provided with oxygen from the oxygen providing device 26, and, since the presence of oxygen prevents curing of the polymerizable resin $L_2$, areas in the printing area P where the object O will not have cured material is provided with oxygen from the oxygen providing device 26.

Each electrode 54a and 56a is individually electronically connected to the electronic controller 32 via, for example a corresponding array of microscopic wires (not shown for the sake of clarity). Therefore, the electronic controller 32 can selectively provide the appropriate electric potential (positive to the electrodes 54a and negative to the electrodes 56a) depending on whether or not the polymerizable resin within the corresponding predetermined location of the printing area P above the electrodes 54a and 56a area is to be cured by light from the resin curing device 28, thereby forming the appropriate shape of the object O.

The gas permeable liquid $L_1$ can include one or more of the following group of materials: silicone containing polymers include polydimethylsiloxane (PDMS), cross-linked poly(dimethylsiloxane), poly((trimethylsilyl)propyne) and cross-linked poly(dimethylsiloxane) core and a polydimethylsiloxane and a poly(sils esquioxane) (PDMS/POSS), nafion (sulfonated tetraflouroethylene); co-polymers such as: poly(dimethylsiloxane)-polyamide multiblock copolymer; copolymerizations of diphenylacetylenes having various silyl groups [PhC^CC6H4-R]; R ¼ p-SiMe3 (TMSDPA), p-SiEt3 (TESDPA), p-SiMe2-n-C8H17 (DMOSDPA), and p-SiPh3 (TPSDPA)] diphenylacetylene having a tert-butyl group (PhC^CC6H4-tertBu; TBDPA poly (TPSDPA-co-TBDPA, poly(TMSDPA-co-TBDPA), poly[1-(p-trimethylsilyl)phenyl-2-(p-trimethylsilyl)phenylacetylene]; Teflon™ AF 2400, Teflon™ AF 1600, Teflon™ AD 60, Dimethylsilicone rubber, Dimethylsilicone oil, Fluorosilicone, Fluorosilicone oil, Nitrile rubber and PTFE.

Alternatively, the gas permeable liquid $L_1$ can include one or more of the following group of materials: silicon oil with addition of solid oxygen permeable particles, silicon oil with addition of silicone containing polymers that enhance oxygen permeability such as at least one inorganic material, metalloids, boron nitrides, metal oxides (including iron oxide, aluminum oxide, titanium dioxide, zirconium oxide and metal sulfides, such as ZnS and CdS, 100-200 nm in size and 1-10% weight percentage of inorganic materials in the matrix.

The gas permeable liquid $L_1$ is provided with oxygen $O_2$ in large part so that the gas-permeable liquid $L_1$ does not get cured and hardened by operation of the resin curing device 28.

The amount of the polymerizable resin $L_2$ supplied to the tank 20 is estimated as being the amount of resin necessary to print the object O. The polymerizable resin $L_2$ used during the printing process can be a photopolymer. The photopolymer used as the polymerizable resin $L_2$ can be any of a variety of materials. Table 1 below is provided as examples of photopolymers that can be used to print the object O.

TABLE 1

PHOTOPOLYMERS:

| Material | PI wavelength (photoinitiators) |
| --- | --- |
| Nylon | 290-315 |
| Acrylic | 290-315 |
| Styrene Acrylonitrile | 290, 310-330 |
| Polycarbonate | 280-310 |
| Polystyrene | 310-325 |
| Polyethylene | 300-310, 340 |
| Polypropylene | 290-300, 330, 370 |
| ABS | 300-310, 370-385 |
| PVC homopolymer | 320 |
| PVC copolymer | 330, 370 |
| Polyurethane (aromatic) | 350-415 |

Operation of the printer assembly 12 via control by the electronic controller 32 is now described in greater detail below with specific reference to FIGS. 9-14.

Figure 9:
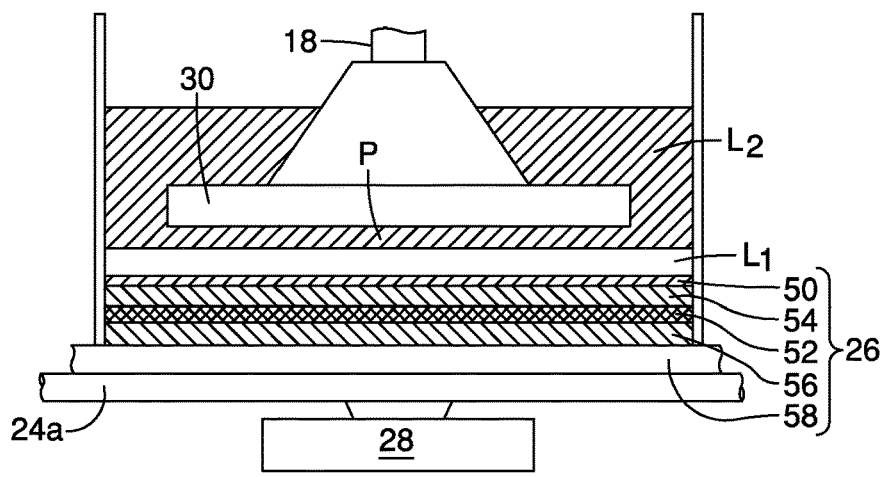
FIG. 9 is a first schematic view of the tank showing the object carrier located at an initial location immediately above the printing area, prior to operation of the oxygen providing device and the resin curing device, in accordance with the first embodiment.

As shown in FIG. 9, the object carrier 30 is initially positioned within the tank 20 and can be completely submerged within the polymerizable resin $L_2$. Initially, all of the polymerizable resin $L_2$ is in a liquid state. The object O to be produced by the 3-D printer apparatus 10 is formed on an underside or bottom surface of the object carrier 30, as described below.

The electronic controller 32 operates the robotic arm 18 (a carrier movement device) in order to position a lower surface of the object carrier 30 at, adjacent to or slightly within the printing area P, as shown in FIG. 9. The lower surface of the object carrier 30 defines an object retaining surface.

Figure 10:
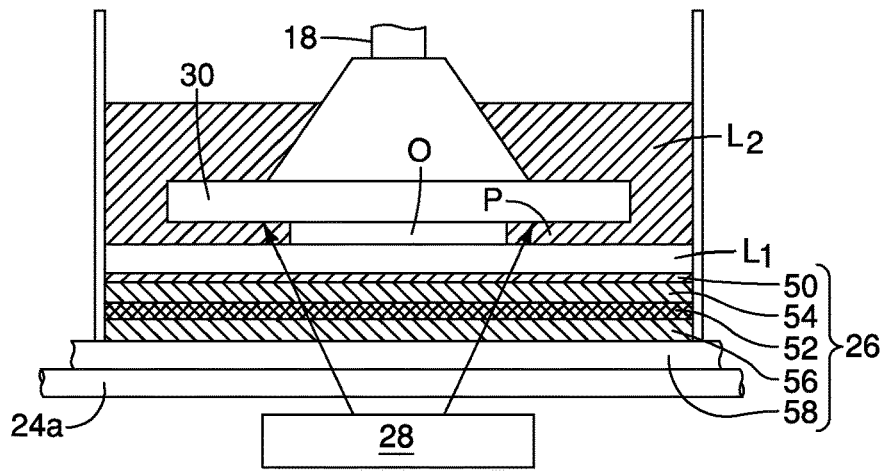
FIG. 10 is a second schematic view of the tank showing the object carrier with a first layer of the object being printed in response to operation of the resin curing device which polymerizes polymerizable resin within the printing area, while simultaneously the oxygen providing device is operated to produce oxygen in predetermined sections of the printing area thereby preventing polymerization of the polymerizable resin located in the predetermined sections in accordance with the first embodiment.

As shown in FIG. 10, the electronic controller 32 operates the oxygen providing device 26 to provide oxygen to predetermined sections of the printing area P where there are to be voids in the object O (sections where there is to be no polymerization of the polymerizable resin $L_2$). Simultaneously, or a few milliseconds later, the electronic controller 32 operates the resin curing device 28, emitting, for example, UV light causing the polymerizable resin $L_2$ in sections of the printing area P other than the predetermined sections, to at least partially or fully cure in an initial printing step. During the initial printing step of the printer assembly 12, a first layer of the polymerizable resin $L_2$ within the printing area P is cured or partially cured such that it attaches to the lower surface (the object retaining surface) of the object carrier 30 thereby beginning the printing process, as shown in FIG. 10.

During this initial printing step, the operation of the oxygen providing device 26 includes the electronic controller 32 providing, for example, a positive 1.4 volt potential to a selected one or selected ones of the electrodes 54a of the positive electrode array 54 thereby causing electrolysis of water producing oxygen that bubbles upward preventing polymerization of the polymerizable resin above the selected one or selected ones of the electrodes 54a of the positive electrode array 54. Simultaneously, a negative 1.4 volt potential is provided to a selected one or selected ones of the electrodes 56a of the negative electrode array 56 thereby causing electrolysis of water producing hydrogen, which drawn off by the water and argon gas within the pipe 24a (duct 24a) of the oxygen source 24.

When the resin curing device 28 is operated, a very high intensity of, for example, UV light is emitted that is stronger than in many other types of 3-D printers due to the presence of oxygen in the predetermined sections of the printer area P. The result is that curing of the corresponding sections polymerizable resin $L_2$ is more rapid and more complete, than in most other 3-D printers. This reduces the printing time and speeds up the overall printing process.

Figure 11:
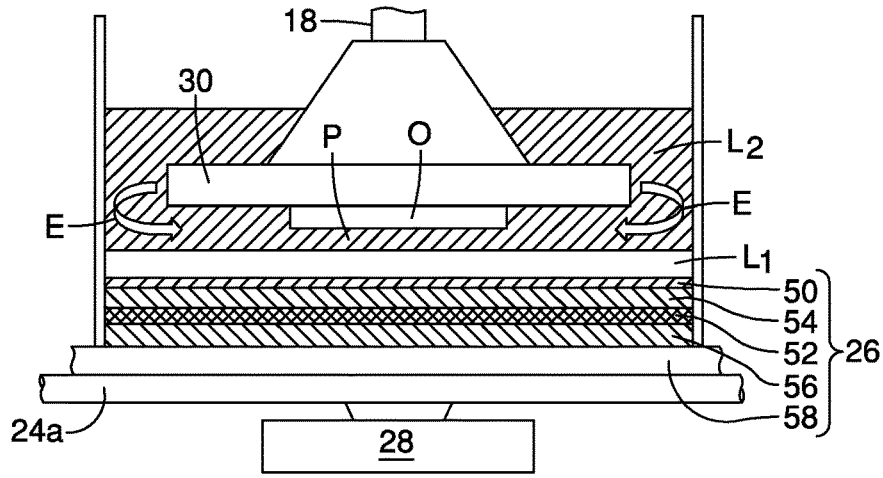
FIG. 11 is a third schematic view of the tank showing the object carrier being repositioned by the robotic arm a predetermined distance above the initial location such that the polymerizable resin flows into the printing area between the surface of the first layer of an object being printed and the first layer of liquid, the flow of polymerizable resin into the printing area being facilitated by electro-osmosis caused by operation of the oxygen providing device in accordance with the first embodiment.

Next, as shown in FIG. 11, the electronic controller 32 operates the robotic arm 18 thereby raising the object carrier 30 and the initial portion of the object O several thousandths of an inch, as determined by the electronic controller 32 such that the polymerizable resin $L_2$ flows into the printing area P due to a variety of reasons, such as simple gravity. However, the polymerizable resin $L_2$ is also urged to flow into the printing area P via electro-osmosis E that is caused by operation of the oxygen providing device 26.

Figure 12:
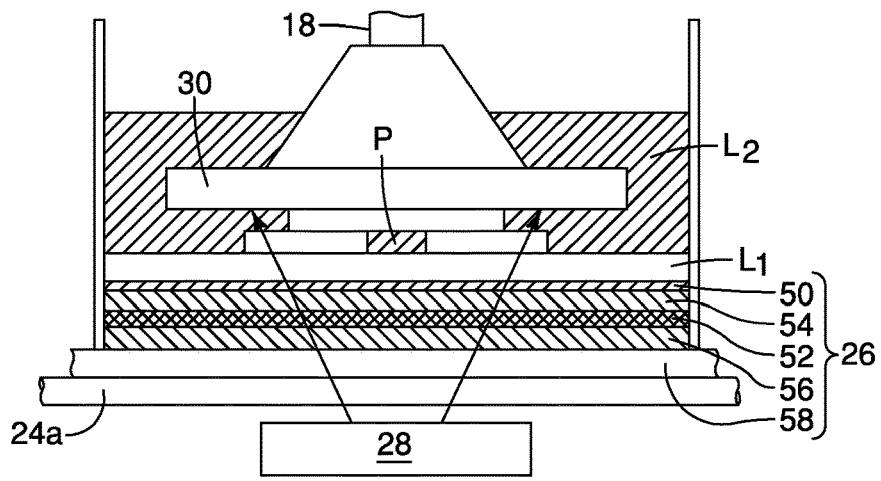
FIG. 12 is a fourth schematic view of the tank showing the object carrier with a second layer of the object being printed on the first layer by operation of the oxygen providing device and the resin curing device in accordance with the first embodiment.

Next, as shown in FIG. 12, the electronic controller 32 operates the oxygen providing device 26 and then the resin curing device 28 causing another predetermined portion of the polymerizable resin $L_2$ to at least partially or fully cure and adhere to the first layer of material forming the object O.

Figure 13:
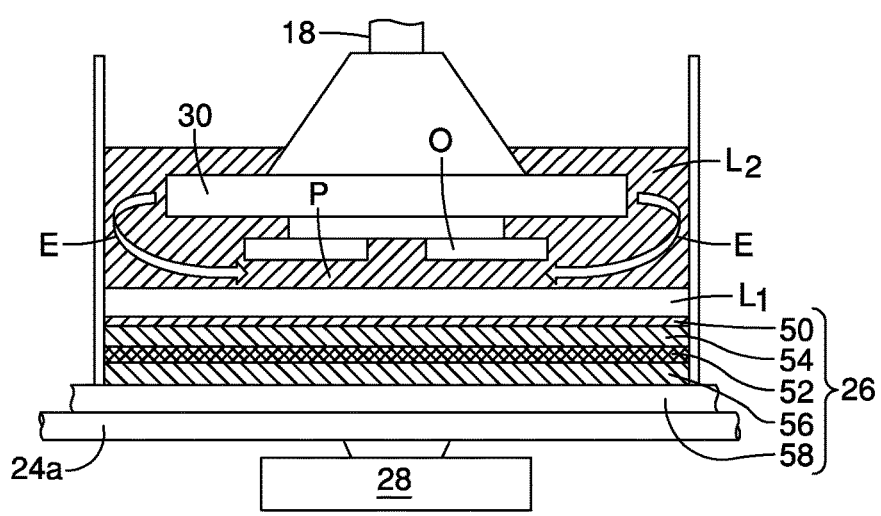
FIG. 13 is a fifth schematic view of the tank showing the object carrier being repositioned by the robotic arm a predetermined distance upward such that more of the polymerizable resin flows between the surface of the second layer of the object being printed and the first layer of liquid in accordance with the first embodiment.

Next, as shown in FIG. 13, the electronic controller 32 operates the robotic arm 18 to again raise the object carrier 30 and the object O a predetermined amount as determined by the electronic controller 32 such that further amounts of the polymerizable resin $L_2$ flow into the printing area P.

Figure 14:
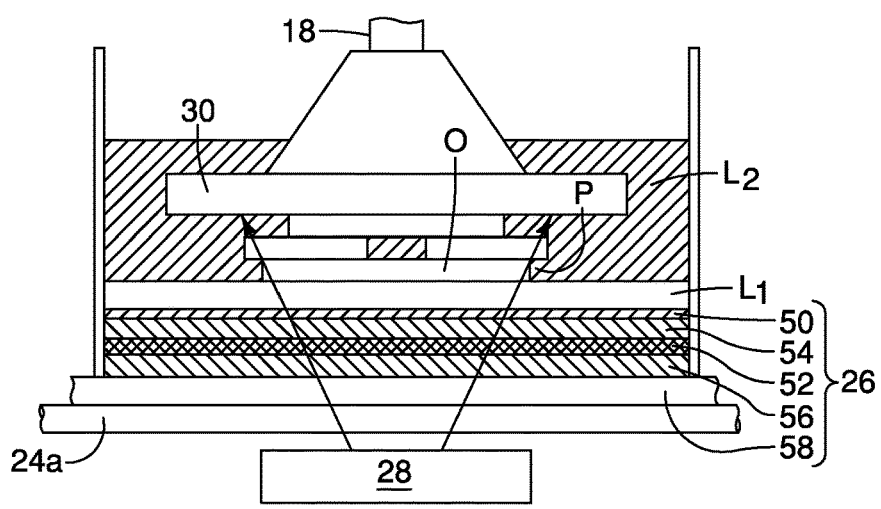
FIG. 14 is a sixth schematic view of the tank showing the object carrier with a third layer of the object being printed on the second layer by operation of the resin curing device in accordance with the first embodiment.

Next, as shown in FIG. 14, the electronic controller 32 operates the oxygen providing device 26 and then the resin curing device 28 causing yet another predetermined portion of the polymerizable resin $L_2$ to at least partially or fully cure and adhere to the first layer of material forming the object O.

The above described operations and shown in FIGS. 9 through 14 are repeated until the object O is fully formed.

In the above described steps, the polymerizable resin $L_2$ can be fully cured during operations of the resin curing device 28 because the intensity of light from the resin curing device 28 is near or at a maximum intensity which makes the curing process quicker and more complete, as compared to many other 3-D printers.

However complete curing is not always necessary, depending upon the size, shape and design of the object O. For example, in a rapid production line, in which many duplicate objects O are being printed, one after another, the printing process can go more quickly, if only partial curing is achieved.

In such a case, after the object O is fully printed, the electronic controller 32 operates the robotic arm 18 to lift the object carrier 30 and the object O out of the tank 20 and into the tank of the rinse station 14 where any uncured and/or any liquid polymerizable resin $L_2$ is washed away. Next, the electronic controller 32 operates the robotic arm 18 to lift the object carrier 30 and the object O out of the tank of the rinse station 14 and into the final curing station 16. The object O is separated from the object carrier 30 and left in the final curing station 16 where the object O is subjected to a further resin curing process via a plurality of light sources within the final curing station 16. The plurality of light sources apply a predetermined amount of appropriate light spectra to completely cure the polymerizable resin $L_2$ thereby completely forming the desired object O.

In general, the gas permeable liquid $L_1$ (a dead zone) enriched with oxygen has an overall density that is greater than the density of the polymerizable resin $L_2$ (top layer $L_2$). Hence, the polymerizable resin $L_2$ floats on the gas-permeable liquid $L_1$ (bottom layer $L_2$).

Second Embodiment

Figure 15:
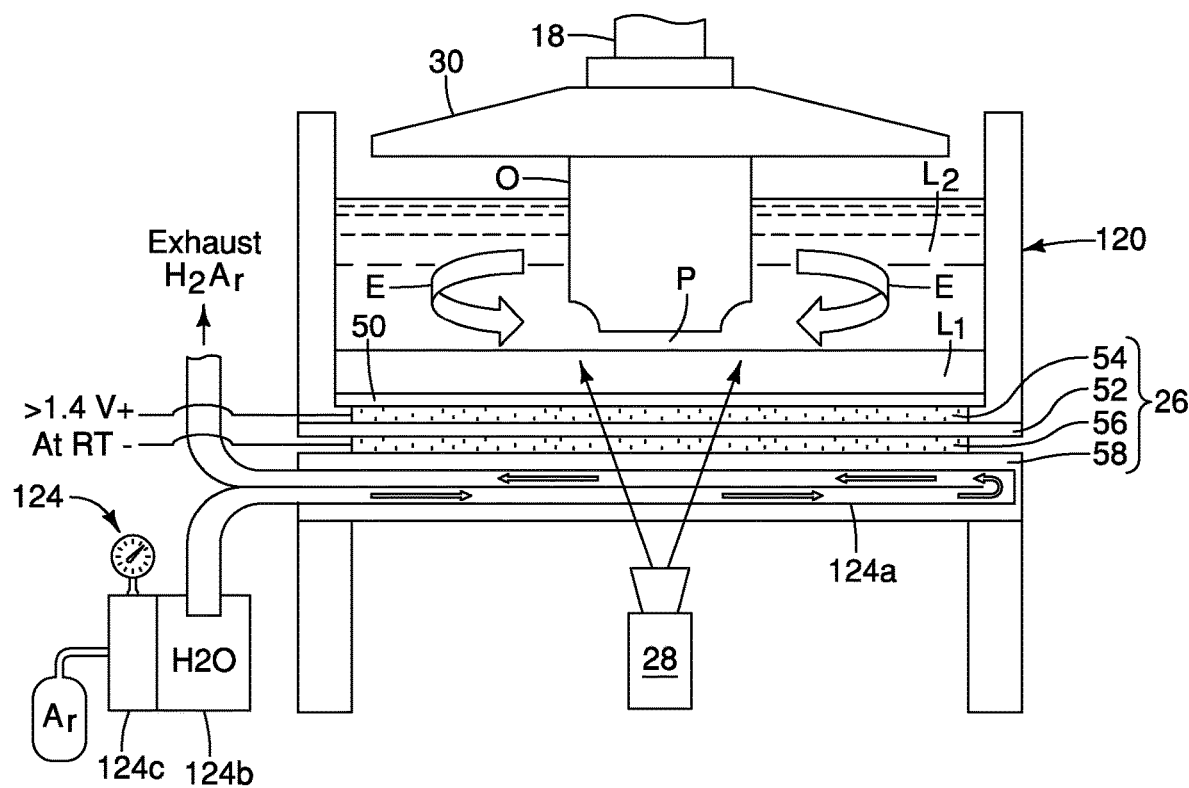
FIG. 15 is a side schematic of a tank showing the bottom structure with U-shaped oxygen source that provide water to the oxygen providing device in accordance with a second embodiment.

Referring now to FIG. 15, a printer assembly with a tank 120 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the bottom structure of the tank 120 of the printer assembly has been modified as compared to the tank 20 of the first embodiment. Specifically, in the second embodiment, the tank 120 includes the oxygen providing device 26 as described above with respect to the first embodiment, and further includes an oxygen source 124 that replaces the oxygen source 24 of the first embodiment.

The oxygen source 124 includes an argon (Ar) source, a duct-like pipe 124a, a water source 124b and a pressure regulation device 124c. The argon (Ar) source, the water source 124b and the pressure regulation device 124c are basically the same as the argon (Ar) source, the water source 24b and the pressure regulation device 24c as described above with reference to the first embodiment. However, in the second embodiment, the pipe 24a of the first embodiment has been replaced with the duct-like pipe 124a. The duct-like pipe 124a has a sideways overall U-shape such that initially the water and argon gas flow under the oxygen providing device 26 in a first direction, then the flow reverses direction and travels back toward the water source 124b and the pressure regulation device 124c to an upwardly extending exhaust.

There are many printer features of the 3-D printer apparatus 10, such as, for example, the robotic arm 18, input device 40 and the display 42, that are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the 3-D printer apparatus. Accordingly, these terms, as utilized to describe the present invention should be interpreted relative to a vehicle equipped with the 3-D printer apparatus.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A 3-D printer apparatus, comprising:
a tank having bottom structure and a printing area located above and spaced apart from the bottom structure, the bottom structure being transparent and including oxygen releasing electrodes, the oxygen releasing electrodes including an array of electrodes, each electrode having an upper end and a lower end, with tapering side surfaces such that each electrode has a trapezoidal shape as viewed from a side thereof, a first gap being defined between respective lower ends of adjacent electrodes and a second gap being defined between respective upper ends of adjacent electrodes, the first gap being larger than the second gap;
an oxygen source located below the bottom structure and the oxygen releasing electrodes, the oxygen source supplying water to the array of electrodes flowing in a horizontal direction relative to the tank;
a gas-permeable liquid within the tank above and along the bottom structure of the tank defining a dead zone below the printing area above the oxygen releasing electrodes;

a polymerizable resin above the gas-permeable liquid and located above and within the printing area;

an object carrier initially located within the tank during a printing process; a carrier movement device attached to the object carrier;

a resin curing device configured to selectively provide light to the printing area; and an electronic controller connected to and controlling operation of the resin curing device, the carrier movement device and the oxygen releasing electrodes, the electronic controller selectively operating areas of the oxygen releasing electrodes thereby releasing oxygen to a predetermined location or locations directly below the printing area in order to control curing of the polymerizable resin during the printing process, the released oxygen flowing upward between the second gap.

2. The 3-D printer apparatus according to claim 1, wherein the bottom structure includes a membrane with the oxygen releasing electrodes being positioned along an upper surface of the membrane.

3. The 3-D printer apparatus according to claim 2, wherein the membrane of the bottom structure is a dense membrane that includes at least one of the following: a modified polytetrafluoroethylene layer, an oxide conducting glass, ceramics, doped cerium oxide and/or an OER catalyst (oxygen evolution reaction catalyst) and/or a water splitting catalyst that includes Pd, Pt or Ni.

4. The 3-D printer apparatus according to claim 2, wherein the bottom structure further includes a lower array of electrodes below the membrane, such that during operation of the oxygen releasing electrodes, the electronic controller selectively applies a positive electric potential to the oxygen releasing electrodes and selectively supplies a negative electric potential to the lower array of electrodes.

5. The 3-D printer apparatus according to claim 4, wherein each of the electrodes of the oxygen releasing electrodes includes platinum.

6. The 3-D printer apparatus according to claim 4, wherein each of the electrodes of the lower array of electrodes include palladium.

7. The 3-D printer apparatus according to claim 4, wherein the electronic controller is configured such that during the printing process one or more of the oxygen releasing electrodes is provided a positive potential of approximately 1.40 volts and a corresponding one or more of the lower array of electrodes is provided with a negative potential of approximately 1.40 volts causing the release of oxygen to the predetermined location or locations directly below the printing area in order to prevent curing of the polymerizable resin present in the printing area immediately above the predetermined location or locations of the printing area.

8. The 3-D printer apparatus according to claim 2, wherein the bottom structure further includes a perforated insulating transparent sheet located above the oxygen releasing electrodes and below the printing area.

9. The 3-D printer apparatus according to claim 8, wherein the perforated insulating transparent sheet of the bottom structure is made from one or more of an oxygen permeable polymer, polytetrafluoroethylene and/or a suitable oxygen permeable material.

10. The 3-D printer apparatus according to claim 1, wherein the oxygen source located below the bottom structure and includes a conduit that extends along the lower surface of the bottom structure, the conduit having a perforated upper surface, the conduit being provided with water and argon gas flowing therethrough during the printing operation.

11. The 3-D printer apparatus according to claim 1, wherein the bottom structure further includes a glass substrate that is between 5 and 10 microns thick.

12. The 3-D printer apparatus according to claim 1, wherein the polymerizable resin is a photopolymer that includes one or more of the following group of materials: nylon, acrylic, styrene acrylonitrile, polycarbonate, polystyrene, polyethylene, polypropylene, ABS, PVC homopolymer, PVC copolymer and aromatic polyurethane.

13. The 3-D printer apparatus according to claim 1, wherein the resin curing device located below the tank and is located to selectively project light upward through the bottom structure of the tank.

14. The 3-D printer apparatus according to claim 1, wherein the gas-permeable liquid defining the dead zone includes one or more of the following group of materials: silicone containing polymers include polydimethylsiloxane (PDMS), cross-linked poly(dimethylsiloxane), poly((trimethylsilyl)propyne) and cross-linked poly(dimethylsiloxane) core and a polydimethylsiloxane and a poly(sils esquioxane) (PDMS/POSS), nafion (sulfonated tetraflouroethylene); co-polymers including one or more of: poly(dimethylsiloxane)-polyamide multiblock copolymer; copolymerizations of diphenylacetylenes having various silyl groups [PhC^CC6H4-R]; R ¼ p-SiMe3 (TMSDPA), p-SiEt3 (TESDPA), p-SiMe2-n-C8H17 (DMOSDPA), and p-SiPh3 (TPSDPA)] diphenylacetylene having a tert-butyl group (PhC^CC6H4-tertBu; TBDPA poly(TPSDPA-co-TBDPA, poly(TMSDPA-co-TBDPA), poly [1-(p-trimethylsilyl)phenyl-2-(p-trimethylsilyl)phenylacetylene]; polytetrafluoroethylene AF 2400, polytetrafluoroethylene AF 1600, polytetrafluoroethylene AD 60, Dimethylsilicone rubber, Fluorosilicone; Nitrile rubber and PTFE.

15. The 3-D printer apparatus according to claim 1, wherein the gas-permeable liquid defining the dead zone includes one or more of the following group of materials: silicon oil with addition of solid oxygen permeable particles, silicon oil with addition of silicone containing polymers that enhance oxygen permeability having at least one inorganic material, metalloids, boron nitrides, metal oxides including iron oxide, aluminum oxide, titanium dioxide and zirconium oxide, and metal sulfides, 100-200 nm in size and 1-10% weight percentage of inorganic materials in a matrix.

16. The 3-D printer apparatus according to claim 1, wherein the oxygen releasing electrodes are arranged in a pixelated array that is at least 1000 by 1000, and the oxygen releasing electrodes generate electro-osmotic flow of the polymerizable resin within the tank when operating.

17. The 3-D printer apparatus according to claim 1, wherein the electronic controller selectively operates one or groups of the electrodes in a pixelated array of oxygen releasing electrodes to the predetermined location or locations directly below the printing area hereby releasing oxygen to the predetermined location or locations directly below the printing area interfering with curing of the polymerizable resin in the predetermined location or locations directly below the printing area, thereby forming an object attached to the lower surface of the object carrier with a void or voids.

18. The 3-D printer apparatus according to claim 1, wherein
the oxygen source includes a conduit that has a sideways overall U-shape such that water and argon gas from the oxygen source flow under the oxygen releasing electrodes in a first direction in a first portion of the conduit, then flow in a second direction opposite the first direction in a second portion of the conduit traveling back toward the oxygen source.

* * * * *